(12) United States Patent
Van Der Werf

(10) Patent No.: US 7,044,303 B2
(45) Date of Patent: May 16, 2006

(54) PACKAGING MADE OF MOULDED FIBRE MATERIAL

(75) Inventor: Roland Edwin Van Der Werf, Drachten (NL)

(73) Assignee: Huhtamaki Protective Packaging B.V., Franeker (NL)

( * ) Notice: Subject to any disclaimer, the term of this patent is extended or adjusted under 35 U.S.C. 154(b) by 0 days.

(21) Appl. No.: 10/472,819

(22) PCT Filed: Mar. 22, 2002

(86) PCT No.: PCT/NL02/00187

§ 371 (c)(1),
(2), (4) Date: Apr. 12, 2004

(87) PCT Pub. No.: WO02/076849

PCT Pub. Date: Oct. 3, 2002

(65) Prior Publication Data

US 2004/0168953 A1     Sep. 2, 2004

(30) Foreign Application Priority Data

Mar. 26, 2001   (NL) .................................... 1017689

(51) Int. Cl.
   *B65D 85/30*   (2006.01)
   *B65D 73/00*   (2006.01)
(52) U.S. Cl. .................... 206/586; 206/592; 206/488
(58) Field of Classification Search ................ 206/521, 206/586, 587, 591–594, 453, 564, 589, 320, 206/488, 68, 418; 229/406, 407
See application file for complete search history.

(56) References Cited

U.S. PATENT DOCUMENTS

| 3,135,450 | A |   | 6/1964 | Chaplin |
| 3,381,782 | A | * | 5/1968 | Ikelheimer .................. 206/593 |
| 3,608,706 | A | * | 9/1971 | Vigue ......................... 206/521 |
| 3,708,084 | A | * | 1/1973 | Bixler et al. ............... 217/26.5 |
| 4,572,371 | A | * | 2/1986 | Asenbauer .................. 206/564 |
| 5,335,770 | A | * | 8/1994 | Baker et al. ................ 206/433 |
| 5,678,692 | A | * | 10/1997 | Gratz ......................... 206/453 |
| 5,799,796 | A |   | 9/1998 | Azelton et al. |
| 6,123,200 | A |   | 9/2000 | Stephens et al. |

FOREIGN PATENT DOCUMENTS

DE    196 28 660 A1    2/1997
JP    2000-281140    10/2000

* cited by examiner

*Primary Examiner*—Mickey Yu
*Assistant Examiner*—J. Gregory Pickett
(74) *Attorney, Agent, or Firm*—Young & Thompson

(57) ABSTRACT

Packaging (1) of moulded paper fibre material. An article (2) enclosed by an end piece at either side. With this arrangement protection in three directions is necessary. This protection is obtained by means of buffer elements (7, 8). In order to arrange such buffer elements in a technically simple manner on three sides, it is proposed to construct some of the buffer elements as an upright body the limiting walls (9) of which are partially semicircular and partially straight, the straight walls being essentially parallel to one another and merging into the end limit of the packaging.

5 Claims, 2 Drawing Sheets

PACKAGING MADE OF MOULDED FIBRE MATERIAL

BACKGROUND OF THE INVENTION

The present invention relates to a packaging made of moulded fibre material for an article, comprising at least one protective member arranged in said packaging, which protective member has a wall which projects from the base of said packaging and has an essentially flat end surface for contact with said article.

Packaging of this type is generally known in the state of the art. The aim is increasingly to replace plastic foam packaging by paper fibre material. Environmental considerations are the main reason for this. Packaging of this type is, for example, end pieces that are pushed onto electronic equipment, such as, for example, televisions, video recorders and the like. Packaging of this type is also used for containing smaller articles, such as mobile telephones, razors and the like, on at least four sides.

With such packaging the specification is always that buffer elements have to be arranged in at least two directions perpendicular to one another. Such buffer elements project from the base of the packaging. If such a packaging is, for example, made in tray form, this means that buffer elements have to be arranged in three mutually perpendicular directions in order to provide protection in the same three directions.

When moulding products from paper fibre material it is important to be able to work with relatively simple moulds which are designed such that they release in a simple manner.

A buffer element known in the state of the art is of truncated cone construction. It will be understood that it is not possible to form two such truncated cones in directions perpendicular to one another using a simple one-part mould.

SUMMARY OF THE INVENTION

The aim of the present invention is to provide buffer elements which provide a high degree of cushioning and do not give rise to any restrictions with regard to the ease of release of the product.

The aim is achieved with a packaging as described above in that said wall comprises a semi-circular wall section with straight wall sections adjoining the latter.

As a result of making the buffer elements semi-circular instead of completely circular and, of course, positioning them in the correct way, release problems no longer arise. It is true that the effect of such buffer elements decreases compared with the truncated cone-shaped elements described above, but nevertheless a surprisingly good cushioning effect is obtained. In the case of "tray-shaped" packaging there is frequently sufficient space along the side walls to arrange a number of such elements so that the required mechanical properties can be achieved. Furthermore, it has been found that the amount of energy to be absorbed is constant per buffer, can be multiplied and is reproducible.

According to a further advantageous embodiment of the invention, the straight walls described above are substantially parallel. Of course, parallel must also be understood to mean the situation in which the walls are at a slight angle to one another in order to allow release.

According to a further variant of the invention, a further circular wall section can adjoin the straight section, the curvature of said further circular wall section at the junction with the straight wall section being opposite to the curvature of the semi-circular wall section at the junction with the straight wall section.

The length of the straight section located between the two oppositely curved wall sections can vary depending on the requirement. In principle, it is possible for the two curved wall sections to adjoin one another directly, so that the straight section is infinitely short.

According to a further advantageous embodiment, said protective members or buffer elements extend essentially perpendicularly to the related wall.

As already indicated, various protective members can be arranged alongside one another and a U-shaped space is preferably delimited between them.

In order to provide adequate "deformation space" in corner regions, it is proposed to arrange the protective elements not in the corner of two adjoining walls but some distance apart. Preferably, such a distance approximately corresponds to the radius of curvature of the semi-circular wall section.

It is also possible to make this free space such that the free top end of the protective member arranged on one side does not come into contact with the free top end of a protective member arranged on a side extending perpendicularly at that location.

The packaging will be made depending on the product to be packed and can, for example, be of tray-shaped construction. In any event it is possible to provide one side thereof with the truncated cone-shaped protective members described above. After all, the problem of not allowing release does not exist in one direction. Such complete truncated cone-shaped members are preferably constructed in such a way that the cone angle is relatively small. A cone angle of approximately 7° is preferred. Preferably these cones are not provided with longitudinal seams (approximately parallel to the axis of the cone). It has been found that ideal cushioning characteristics are obtained by this means. If a truncated cone is produced in accordance with these conditions, the cone material will concertina and not knuckle away if it hits an object, for example on falling. The packed product can be better protected as a result.

BRIEF DESCRIPTION OF THE DRAWINGS

The invention will be explained in more detail below with reference to an illustrative embodiment shown in the drawing. In the drawing.

DESCRIPTION OF THE PREFERRED EMBODIMENTS

Figure 1:
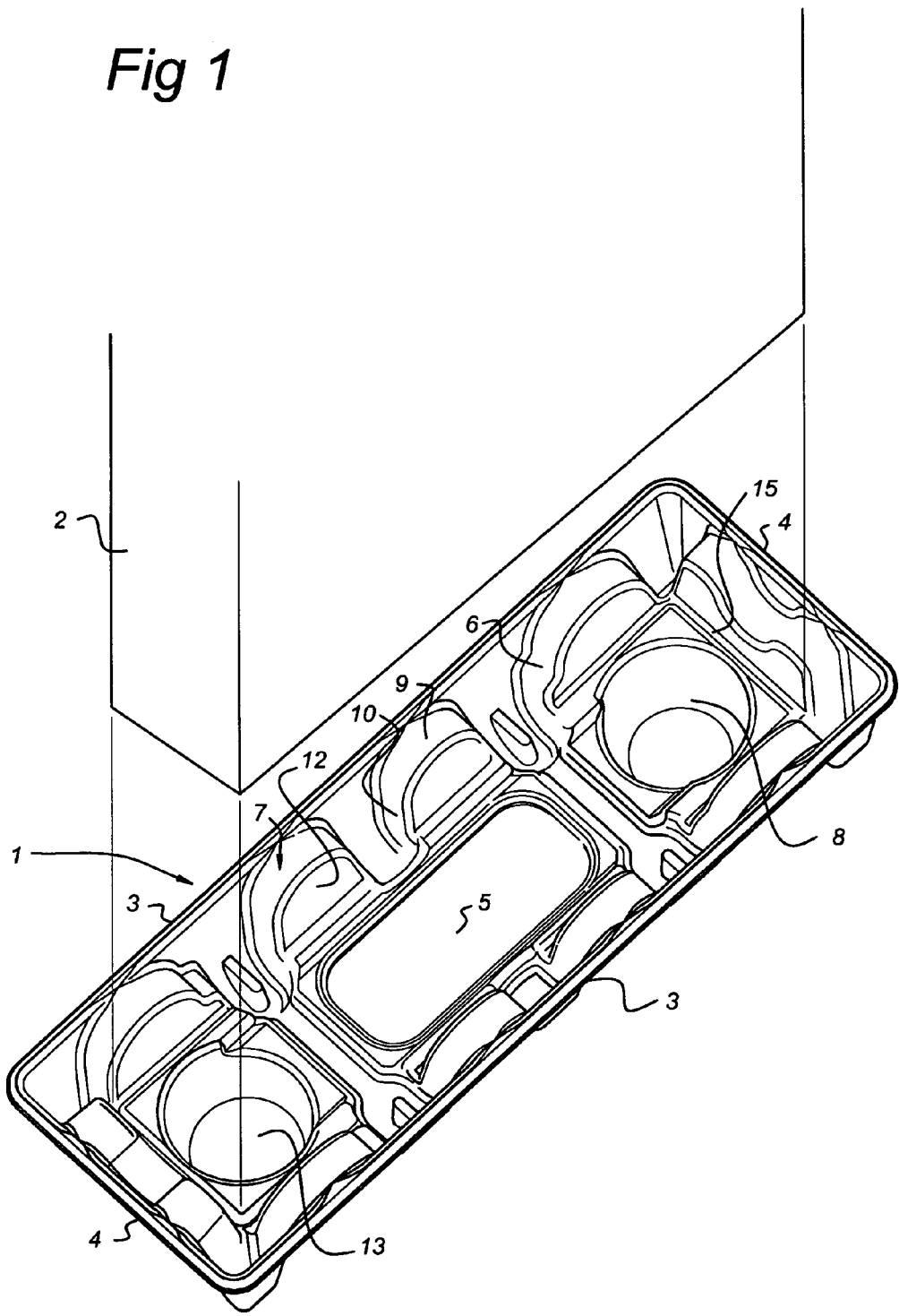
FIG. 1 shows a perspective plan view of one embodiment of the packaging according to the invention.
Figure 2:
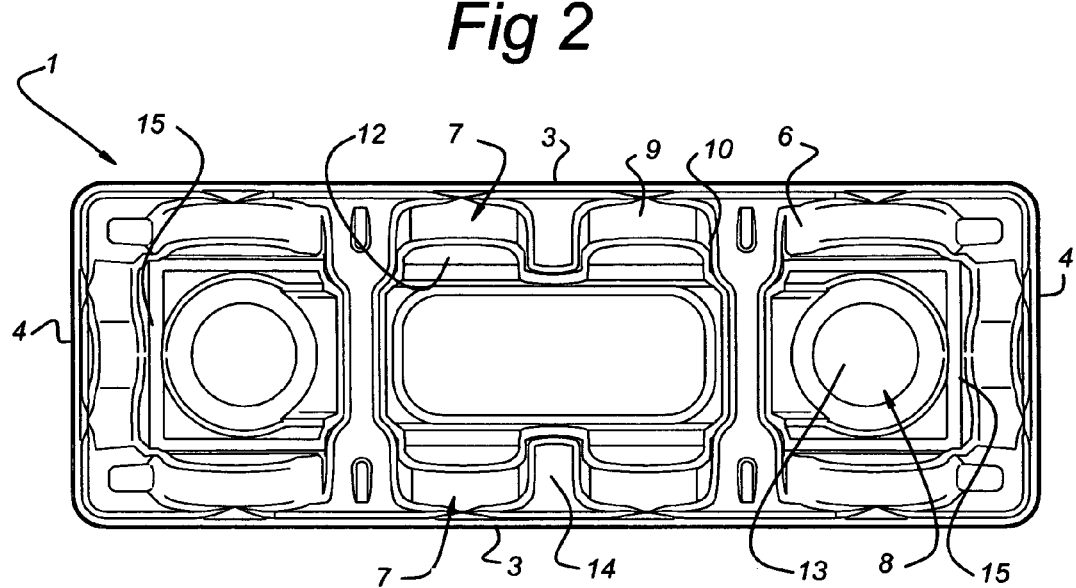
FIG. 2 shows a plan view of the packaging according to FIG. 1.
Figure 3:
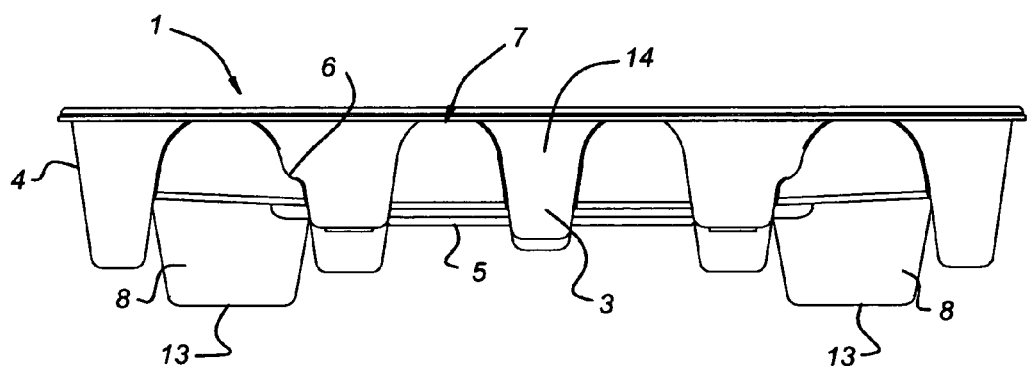
FIG. 3 shows a side view of the packaging according to FIG. 1.

In FIGS. 1–3 an example of the packaging according to the invention is indicated in its entirety by 1. It must be understood that such a packaging is merely an example. In FIG. 1 an article 2 that can be packed in the packaging is indicated diagrammatically. For instance, it is possible to provide such an article with such a packaging at both ends. Optionally an outer packaging can be fitted in order to hold the packaging 1 in place. However, other types of packaging can also be produced using the present invention.

The packaging shown in the figures is of tray-shaped construction. This packaging is provided with two side walls 3 and opposite end walls 4 and a base wall 5.

A number of buffer elements are present. Semicircular buffer elements are indicated by 7, whilst conical buffer elements are indicated by 8. The end wall of conical buffer element 8 is indicated by 13, whilst the end wall of buffer element 7 is indicated by 12. This end wall 12 is constructed to bear against the article concerned.

Apart from a semicircular upright wall section 9 there are two straight upright wall sections 10 adjoining the latter for each buffer element 7. The straight wall sections extend essentially parallel to one another, provision of course being made to allow release. The step 6 shown in the figures has been made because of a very specific construction of the article to be packed. It will be understood that further variations can be made so that optimum protection of the article to be packed is obtained.

A groove 15 extends at the boundary of each of the buffer elements and the base wall 5. As a result the buffer element can deform independently of the base wall, as a result of which external forces can be directed and absorbed in an optimum manner.

The conical buffer element 8 preferably has a cone angle of approximately 4–10° and more particularly approximately 7°. It has been found that at this value, on the one hand, optimum release is guaranteed and, on the other hand, the strength is maximum.

As has already been indicated above, it is possible to protect a wide range of products using packaging according to the invention. In this context only the shape of the buffer elements is important, and not the construction of the base sides of the packaging from which these buffer elements extend. Moreover, it will be understood that for those skilled in the art a number of variants are obvious after reading the above description, which variants fall within the scope of the present invention as described in appended claims.

The invention claimed is:

1. A packaging made of moulded fibre material for an article to be protected by the packaging, comprising at least one protective member arranged in said packaging, which protective member has a wall which projects from a base of said packaging and has an essentially flat end surface for contact with said article, wherein said protective member is integral with said base, and wherein said wall comprises a semicircular wall section with straight wall sections adjoining the latter, and further comprising a step wall section between one of the straight sections and the semicircular wall section, a curvature of said step wall section being opposite to the curvature of the semi-circular wall section.

2. Packaging of molded fiber material for protecting an article, the packaging comprising:

a base and a peripheral wall extending around and being integral with said base, said peripheral wall having plural indentations therein that extend inward to hold an article in the packaging, wherein each of said indentations has a flat, arch-topped, article-facing face that is generally parallel to a portion of said wall from which the respective one of said indentations extends, two straight sides generally perpendicular to said base and to said face, and an arched section that joins said two sides and that is generally perpendicular to said face.

3. The packaging of claim 2, further comprising a step wall section between said arched section and one of said sides, said step wall section having a curvature opposite a curvature of said arched section.

4. The packaging of claim 2, wherein said arched section opens toward said base.

5. A packaging made of moulded fibre material for an article to be protected by the packaging, comprising at least one protective member arranged in said packaging, which protective member has a wall which projects from a base of said packaging and has an essentially flat end surface for contact with said article, wherein said protective member is integral with said base, and wherein said wall comprises a semi-circular wall section with straight wall sections adjoining the latter, and further comprising a peripheral member that extends around said base, wherein said protective member is an indentation in said peripheral member that extends inward to hold the article in the packaging, and wherein said flat end surface is arch-topped.

* * * * *